R. HAMILTON.

HARROW AND SEED SOWER.

No. 10,188. Reissued Aug. 29, 1882.

WITNESSES:
Frank A. Jacob
Geo. P. Hood.

INVENTOR:
Robert Hamilton
By H. P. Hood.
Atty.

R. HAMILTON.

HARROW AND SEED SOWER.

No. 10,188. Reissued Aug. 29, 1882.

WITNESSES:
Geni P. Hood.
Frank A. Jacob.

INVENTOR:
Robert Hamilton.
By H. P. Hood
Atty.

UNITED STATES PATENT OFFICE.

ROBERT HAMILTON, OF FRANKLIN, INDIANA.

HARROW AND SEED-SOWER.

SPECIFICATION forming part of Reissued Letters Patent No. 10,188, dated August 29, 1882.

Original No. 230,271, dated July 20, 1880. Application for reissue filed May 24, 1882.

*To all whom it may concern:*

Be it known that I, ROBERT HAMILTON, a resident of Franklin, in the county of Johnson and State of Indiana, have invented certain new and useful Improvements in a Combined Harrow and Seed-Sower; and I do hereby declare that the following is a full, clear, and exact description thereof, having reference to the accompanying drawings, and to the letters of reference thereon making part of this specification.

My invention relates to that class of harrows which consists of a series of star-shaped wheels slipped upon a shaft, which shaft is mounted in suitable bearings on a frame, and the star-shaped wheels rotate by contact with and insertion in the earth as the harrow is drawn forward.

It relates also to an attachment to said harrow for automatically sowing seed or fertilizers, or both, at the same time that the earth is harrowed.

My invention consists, first, in a harrow consisting of a series of star-shaped wheels having each three radial arms, and each wheel of said series being adapted by itself alone to slip loosely on a shaft common to all, and each provided with interlocking hubs, constructed, as hereinafter described, whereby the series of wheels, when placed together on said shaft, as described hereinafter, and caused to revolve, grip said shaft and cause it to revolve.

My invention further consists in constructing the seed-sowing mechanism so that it may be used for sowing two kinds of seed or seed and fertilizer simultaneously, or one kind of seed or fertilizer, as desired, all as hereinafter more fully set forth.

Figure 1:
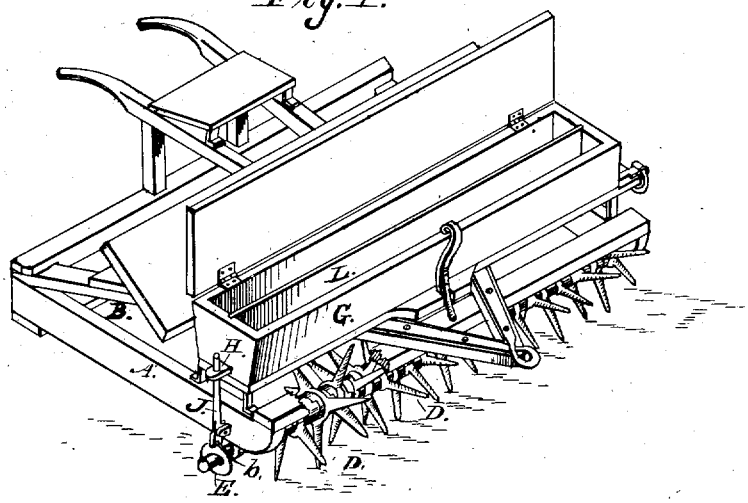
Figure 2:
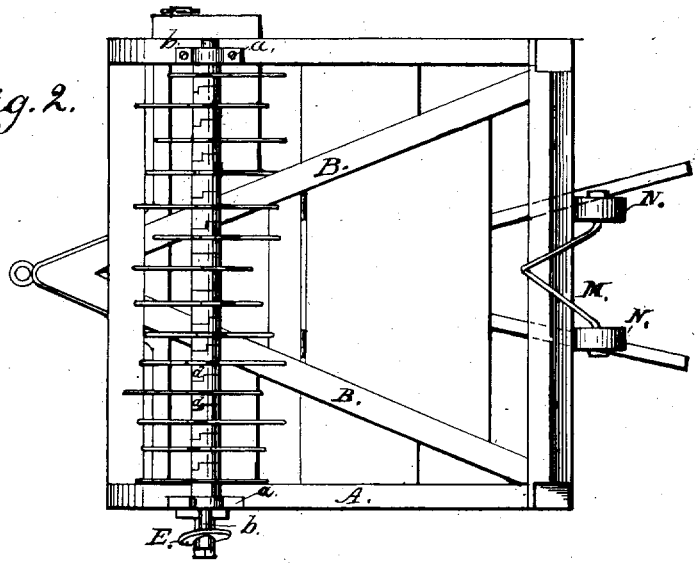
Figure 3:
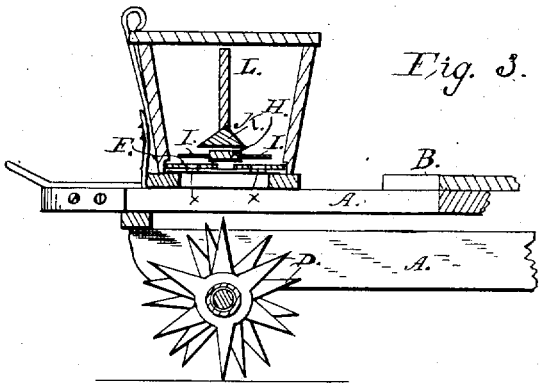
Figure 4:
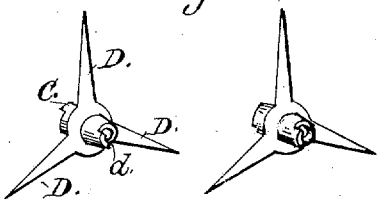
Figure 5:
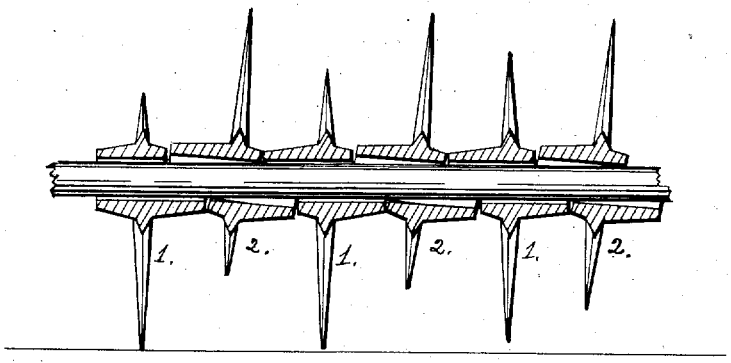

Figure 1 is a perspective view of my combined harrow and seed-sower. Fig. 2 is a bottom view of the same. Fig. 3 is a central cross-section thereof. Fig. 4 is a perspective view of two of the wheels composing the harrow. Fig. 5 is an enlarged longitudinal section of a portion of the shaft and series of star-wheels.

A represents the frame of the harrow, made in rectangular or other suitable shape, and provided with two diagonal or inclined braces, B B, which run from the rear corners to a central point in front of the frame, and to these connected ends of the braces the team is to be connected.

In boxes *a a*, on the under-sides of the side pieces of the frame, is placed a shaft, *b*, which is rotated therein by the action of the toothed or star wheels placed thereon. Each of these wheels is composed of a hub, C, with three tapering radial arms, D, at equal distances apart. The ends of said hub are partially cut away, so that when two or more are placed together on the shaft the ends of the hubs interlock, the cut-away portion of each being filled by the projecting portion of the other. It will be observed that the longitudinal faces of the projecting portions of each end of the hub are not in line with each other, one being set a little ahead of the other. It will also be observed that the position of the projecting and cut-away portions of the hub do not bear the same relation to the radial arms in wheels 1 and 2, Fig. 4. In wheel 1 the face of the projecting portion is nearly opposite the center of an arm, while in wheel 2 it is opposite a point about half way between the arms, so that when the hubs of a No. 1 and a No. 2 wheel are interlocked, the arms of each bisect the spaces of the other.

In forming my harrow I place on the shaft a No. 1 and a No. 2 wheel alternately. My object in having only three radial arms on each wheel and in arranging them so that the arms of each alternate wheel shall bisect the spaces between the arms of its companion wheel is that each alternate wheel shall be comparatively free or out of contact with the ground, while its neighbor is strongly in contact, for the purpose hereinafter explained. If the faces of the projections on the two sides of each hub were in line with each other, the result would be that the points of the arms in alternate wheels would form lines parallel with the shaft, and they would therefore strike the ground simultaneously, thereby producing an equal strain on all, along the shaft in the same direction, and the wheels, being loosely slipped on the shaft, would revolve thereon; but the points being spirally arranged by means of the before-described arrangement of the interlocking portions of the hubs, and also being so constructed and arranged that each alternate wheel is comparatively free from contact with the ground, the points of the different wheels strike the ground successively, and the tendency of those in contact with the ground to rotate on the shaft is met by the pressure of the interlocking ends of their hubs against the ends of the hubs of those not in contact with the ground, thereby cramping them on the shaft, as clearly shown in Fig. 5. I make two sets or series of wheels, so as to form in fact two separate rollers on the same shaft, with their spirals running in opposite directions round the rollers from the center toward each end.

On one end of the shaft or axle *b* is attached a disk, E, set in an inclined position, as shown particularly in Fig. 2.

On top of the forward portion of the frame is placed a seed-box, G, having two rows or series of openings, *x x*, in its bottom.

Immediately above the seed-box bottom are two longitudinal slides, F F, provided with corresponding openings, so as to regulate the amount of seed or fertilizer sown through each set or series of openings *x*.

Above the slides F F is a longitudinally-reciprocating agitator, consisting of a straight bar, H, with a series of teeth, I, extending on each side thereof over the two slides. This agitator projects at one end through the seed-box, and through this projecting end is passed the upper end of a lever, J, which is suitably pivoted to the side of the main frame, so as to rock slightly. The lower end of the lever J is forked and straddles the inclined disk E. By the revolution of the shaft *b* and disk E the lever J obtains a rocking motion on its pivot, which gives a reciprocating motion to the agitator, thereby preventing any clogging.

Above the agitator is a triangular division-piece, K, running lengthwise in the seed-box, and fastened to the ends of the box.

L is a central longitudinal partition, fitting in grooves in the end pieces of the box, and coming down on the top angle of the division-piece K. By this arrangement the seed-box is divided longitudinally into two parts, so as to sow seed and distribute fertilizer at the same time, or any other two articles in different proportions at the same time. By removing the partition L the box becomes all one, and seed or other articles may be distributed, as desired. The rear part of the frame is supported on a truck, M, with two wheels, N N, the truck being arranged, like an ordinary caster-frame, to turn more or less to either side.

I am aware that harrows have been made that consist of a series of wheels or hubs with projecting teeth and arranged to interlock with each other in such a manner as to bring the teeth in spiral form; but in such cases the rollers formed by the wheels or hubs will turn on the axle, or, if the axle is to be rotated, the wheels must be fastened thereon. By my invention of having only three radial arms or teeth in each wheel and arranging said wheels alternately on the shaft, as described, and in such manner that the points of the teeth form spiral lines, there is no need of any extraneous fastenings, as a twist and bind of the wheels on the shaft is formed, which will perforce rotate the same.

Having thus fully described my invention, I claim as my invention and desire to secure by Letters Patent—

1. A harrow consisting of a series of star-shaped wheels having three radial arms, each wheel of said series being adapted by itself alone to slip loosely on a shaft common to all, and each provided with interlocking hubs, constructed as described, whereby the series of wheels, when placed together on said shaft, as described, and caused to revolve, grip said shaft and cause it to revolve.

2. In a combined harrow and seed-sower, the combination, with the seed-box G, provided with two rows of openings, *x x*, in its bottom, of the two longitudinal slides F F, agitator H, and removable partition L, for the purpose set forth.

ROBERT HAMILTON.

Witnesses:
H. P. HOOD,
OZNI P. HOOD.